Sept. 17, 1929.　　　E. M. KINSLOW　　　1,728,184
METHOD OF MAKING FLOUR
Filed April 18, 1922
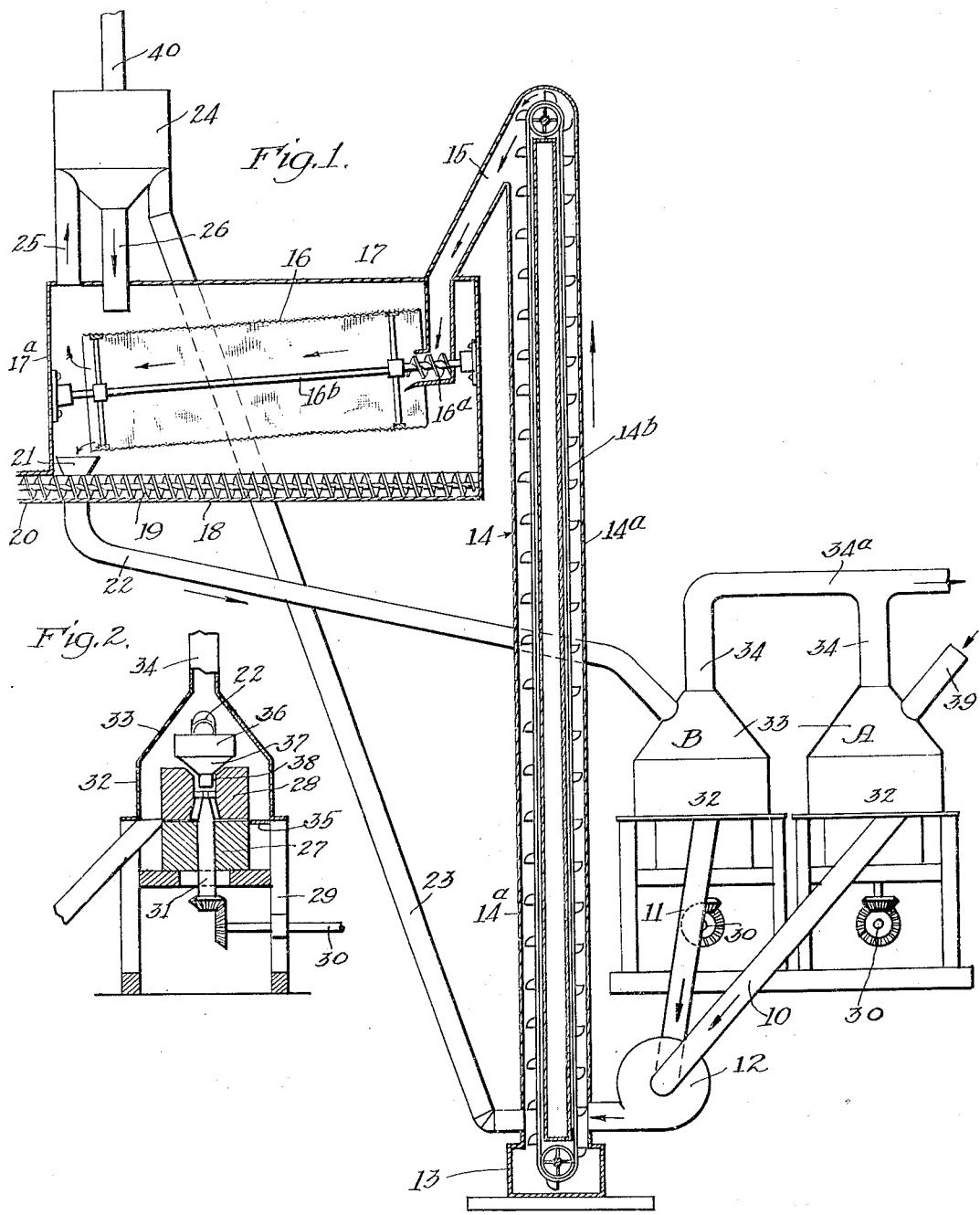
Inventor:
Elijah M. Kinslow
By James T. Barkeley
his Attorney Patented Sept. 17, 1929

1,728,184

UNITED STATES PATENT OFFICE

ELIJAH M. KINSLOW, OF LOS ANGELES, CALIFORNIA, ASSIGNOR, BY MESNE ASSIGNMENTS, TO VITIMIN MILLING CORPORATION, OF LOS ANGELES, CALIFORNIA, A CORPORATION OF DELAWARE

METHOD OF MAKING FLOUR

Application filed April 18, 1922. Serial No. 554,897.

It has been found in practice, in comminuting grain in a buhr mill, that the heat generated between the stones has a deleterious effect upon the constituents of the grain, resulting in a flour product which is vitally lacking in nutritive value. The action of this frictional heat upon the chemicals, such as phosphorous, potash, lime and silicon, so alters and changes their chemical properties as to destroy their otherwise beneficent effect as food products. It is therefore the foremost object of the present invention to provide a means whereby the mill and flour products are air-cooled and kept cool during the grinding operation, to preserve, as far as possible, all of the chemical properties of the grain in their natural state. It is furthermore an object—in addition to air-cooling the mills and products—to carry off excessive moisture from the resulting flour products, and to do this in such a way that a minimum amount of flour is lost in the process.

The present invention, as herein disclosed in its preferred specific embodiment, deals with the method of and apparatus for the milling of flour wherein all of the constituents of the grain are utilized; although in principle, it need not be limited to such. In the apparatus, herein shown and described, I use two mills, one in which the whole grain is first ground, and one in which the tailings from the bolter are reground, after which they are mixed with the products of the first mill so that, except between the bolter and the second mill wherein the unbolted integuments are handled, the whole comminuted products of the grain pass through the apparatus in a commingled state. The nutritive value of a flour product of the whole grain is well known and need not be here further enlarged upon.

The essential details of my method and apparatus will be more fully disclosed in the following specification, reference being had to the accompanying drawings for illustrative purposes in which drawings—

Fig. 1 is a diagrammatic layout, in sectional elevation, of an apparatus suitable for carrying out the steps of my process; and Fig. 2 is a fragmentary sectional view through one of the mills illustrating its preferred arrangement.

In the drawings I have illustrated apparatus embodying the essential elements for suitably carrying out the several steps of my process, but it is to be understood that such apparatus need not necessarily be limited to the precise arrangement shown and to be hereinafter described.

The apparatus comprises essentially two buhr mills, designated by the letters A and B, mounted side by side; having discharge chutes 10 and 11, respectively, discharging into a blower 12. The blower 12 discharges into the lower end of one side of an elevator 14 just above the boot, the latter designated by the numeral 13; and this elevator discharges at its upper end into a chute 15, which communicates with the upper or receiving end of a bolt 16. The bolt 16 is contained within a bolt housing 17; and the fines passing through the bolt are deposited in a trough 18, in the bottom of the housing 17, and are thence conducted to suitable storage bins (not shown) through the medium of a screw conveyor 19 operating in and through a discharge chute 20. The integuments or coarser particles failing to pass through the bolt 16 are discharged from its lower end into a suitable hopper 21, mounted on the upper end of a tube 22; the latter connecting at its discharge end with the mill B.

The air blast produced by the blower 12 is dissipated by discharging through the side 14ª of the elevator 14 and chute 15, into the bolt casing 17, or through a suitable tube 23, connected at its lower end to the opposite side 14ª of the elevator 14 and at its upper end to a suitable separator 24 mounted upon the bolt housing 17. The separator 24 also has an inlet tube 25 communicating with the bolt housing 17, at a point adjacent the discharge end of the bolt 16, and a return chute 26 situated above the bolt 16, and discharging on top of it or beside it intermediate its ends.

The buhr mills A and B, are preferably identical and may be of any approved size and design suitable for properly accomplishing the comminution of the grain, such as overrunner or underrunner stones, or of the roller type. For illustrative purposes I show (in Fig. 2) a typical one of such mills, of the overrunner type, comprising a pair of buhr stones 27 and 28; the former being stationary and supported upon a suitable framework 29; while the latter is rotatable on top of the stone 27, and may be driven by any suitable power through the medium of shafts 30 and 31. A hood 32 is preferably removably mounted over the upper stone 28; having an upper conical portion 33, terminating in a tube 34. The body portion of the hood 32 is slightly larger in diameter than the stone 28; and the annular space surrounding the stone within this hood may be closed at its bottom by a suitable annular plate 35 surrounding the stone 27 and positioned just below the grinding faces, as shown in Fig. 2.

The discharge chutes 10 and 11 are secured at their upper ends in apertures in the plates 35 intermediate the stones and the hood so as to form a comparatively air-tight joint. It may be also noted here that the hoods 32 are substantially air-tight, and form substantially air-tight coverings for the stones, except for the openings into the chutes 10 and 11 and tubes 34. Hoppers 36 are carried by the stones 28, having reduced lower ends 37 extending into the eyes 38 of the stones; their upper ends being of a size to almost but not quite extend to a juncture with the upper conical portions 33 of the hoods 32. Feed pipes 22 and 39 extend through the conical tops of the hoods 32 and terminate just above the hoppers 36 to discharge grain and comminuted particles therein, as will be more fully hereinafter explained.

The upper ends of tubes 34 are preferably connected by a common tube 34ª leading away from the mills A and B and preferably to the exterior of the building in which they are housed in order that fresh cool air may be supplied to the mills.

The discharge chutes 10 and 11 make air-tight connections at their lower ends with the housing of the blower 12; and the blower may be operated in any suitable manner to draw cool air through tubes 34ª and 34, into the hoods 32 and down through the discharge chutes 10 and 11, discharging it into the bottom of the elevator 14. In thus drawing fresh air—preferably from the exterior of the building—into the hoods 32, the bulk of it will be drawn down into the hoppers 36 (which are preferably situated directly beneath and concentric with the tubes 34) through the eyes 38 of the stone and out radially between their contiguous grinding surfaces, and thence downwardly through the chutes 10 and 11, and into the elevator 14. Additionally, a proportion of the air drawn into the hoods 32, through the tubes 34, will pass downwardly therein around the tops of the hoppers 36 to cool the perimeters of the stones 28 and then likewise pass outwardly through the chutes 10 and 11.

After cool air has been thus drawn through the mills A and B and exhausted into the elevator 14, it has served its purpose in cooling the mill and the grain being ground, except possibly for its secondary function of carrying off any moisture that may be in the flour product as it is delivered to the elevator 14. After being discharged into the elevator 14 it is necessary to dissipate the force of the blast produced by the blower, and this I do by permitting it to discharge up the housing 14ª of the elevator 14, past the endless bucket elevator 14ᵇ—and for this purpose the housings 14ª are made sufficiently large to admit of the air passage without interfering with its conveyance of the ground products from the bottom thereof, or it may be discharged up the tube 23 and into the separator 24, or through both of them. The air blast directed up the elevator housings 14ª will discharge into the tube 15, connecting with the bolt housing 17, and into the receiving end of the bolt 15. It will thence pass longitudinally through the bolt 16 and impinge against the opposite end 17ª of the housing 17, whence it will be deflected up the tube 25 and into the separator 24, where the flour products will be separated in the usual manner and settle back into the bolt housing 17 through the tube 26 and be deposited on top of the bolt 16 intermediate its ends; while the air blast will be exhausted through the tube 40. In discharging up the tube 23 the blast will travel directly into the separator 24, the air current passing out through the tube 40, and the separated flour products returning to the bolt housing 17 through the tube 26, as just described.

The separator 24 may be of any of the approved forms—preferably of the "cyclone" type—it being only essential to my process that it be mounted upon the bolt housing 17 in the manner shown, so the separated flour products will be redeposited in the housing on top of the bolt 16, or intermediate its ends, and thence in the trough 18 at its bottom and conveyed to the storage bins, as hereinbefore described. In cases where I utilize the elevator housing 14ª as an exhaust passage for the air blast from the blower 12, I prefer to make the arrangement as illustrated so that the air blast will be carried through the bolt and impinged against the rear wall 17ª and thence into the separator, while the return passage from the separator deposits the separated flour products in the housing 17 intermediate the ends of the bolt. In this way the air currents passing through the bolt and into the separator will not interfere with the return of the separated flour products into the bolt housing through the tube 26.

In operation the grain is first fed to the mill A through the feed tube 39 from whence it passes, and is also drawn, through the chute 10, to the blower 12 and is exhausted into the elevator 14 above the boot 13. The elevator travels in the direction indicated by the arrows and carries the flour products from the mill A upwardly and deposits them in the tube 15, which conveys them into the receiving end of the bolt 16. A short screw conveyor 16ᵃ on the end of the bolt shaft 16ᵇ discharges the flour products from the lower end of the tube 15 into the receiving end of the bolt as indicated by the arrow. The fines passing through the bolts 16 are deposited in the trough 18 in the bottom of the housing 17, and are carried away by the screw conveyor 19 operating in the tube 20, to suitable storage bins. The coarser particles or tailings failing to pass through the bolt 16 are discharged from its lower end into the hopper 21, thence pass through the tube 22, to the mill B, where they are reground and discharged through the chute 11 to the blower 12, from whence they are carried in a commingled state with the products of mill A, through the mill as hereinbefore described. Thus the first ground products and the tailings from the bolt are always passing through the apparatus in a thoroughly commingled state, except when the tailings are traveling from the discharge end of the bolt through the tube 22 to the mill B, and thence to the blower 12. This method of grinding results in a flour product of the whole grain, thoroughly ground and chemically uninjured by the action of heat.

During the aforementioned steps the blower 12 is drawing cool air through the mills A and B, and exhausting it into the elevator 14. From this point the air blast is dissipated up the elevator 14 or through the tube 23, or through both of them. In the case of the former it passes through the tube 15; through the bolt 16, and up the tube 25 into the separator 24, where the flour particles are separated and return to the bolt housing 17 through the tube 26, while the air passes out through the exhaust tube 40. In the case of the latter the air blast is dissipated directly up the tube 23 to the separator 24, where the flour is separated and returned to the bolt housing, as described.

While I have herein shown and described the preferred specific apparatus for carrying on the several steps of my process, it is nevertheless to be understood that I do not wish to be limited by the particular apparatus and arrangement shown and described, but that I desire to make any such changes or modifications in arrangement as will properly come within the scope of the appended claims. For instance, I may dispense with the use of the tube 23, connecting the elevator 14 and separator 24, and utilize only the elevator housings 14ᵃ through which to exhaust and dissipate the blast from the blower 12, or I may use only the tube 23 for this purpose. The essential object to be accomplished in this connection is to so handle the blast from the blower, after it has accomplished its initial function of cooling the mills, as to exhaust it from the apparatus without its carrying with it any quantity of flour.

Having described a preferred form of my invention, I claim:

1. The method of milling flour containing the whole grain comprising grinding the whole grain in a mill and thence separating the fines from the tailings by passing them through a bolter, discharging the tailings from the bolter into a second mill, re-grinding them and thence mixing the re-ground tailings with the ground products of the first mill intermediate said first mill and the bolter, directing a current of cool air between the grinding faces of the mill stones and discharging said air current into the bolter to dissipate its force and recover the flour particles carried thereby, said operations being carried on continuously and simultaneously.

2. The method of milling flour containing the whole grain, consisting of grinding the whole grain in a mill and discharging it into a device for separating the fines from the tailings, discharging the fines into a receptacle and discharging the tailings into a second mill for regrinding, discharging the reground tailings into the ground products of the first mill intermediate it and the separator, and commingling said first ground and reground products of both mills by an air blast intermediate the mills and the separator, said operations being carried on continuously and simultaneously.

3. The method of milling flour containing the whole grain comprising grinding the whole grain in a mill and thence separating the fines from the tailings, regrinding the tailings in a separate mill and mixing them with the first ground products of the first mill by commingling the whole with an air blast, said operations being carried on continuously and simultaneously.

4. The method of milling flour containing the whole grain, comprising grinding the whole grain in a mill and discharging it into a separator, discharging the tailings from the separator into a second mill for regrinding, discharging said reground products into the ground products of the first mill, and thoroughly commingling the products of both mills intermediate them and the separator by passing an air blast through them.

5. The method of milling flour containing the whole grain, comprising grinding the whole grain in a mill and discharging it into a separator, discharging the tailings from the separator into a second mill for regrinding, discharging the reground tailings into the ground products coming from the first mill intermediate said mill and the separator and passing a current of air through the mills to the separator, for cooling the mills, carrying away moisture and thoroughly commingling said first ground and reground products intermediate the mills and the separator, said operations being carried on continuously and simultaneously.

6. The method of milling flour containing the whole grain, comprising grinding the whole grain in a mill and discharging it into a separator, discharging the tailings from the separator into a second mill for regrinding, discharging the reground tailings into the ground products coming from the first mill intermediate said mill and the separator passing a current of air through the mills to the separator, for cooling the mills, carrying away moisture and thoroughly commingling said first ground and reground products intermediate the mills and the separator, and dissipating the force of the air blast at the separator for the recovery of flour particles carried thereby, said operations being carried on continuously and simultaneously.

In witness that I claim the foregoing I have hereunto subscribed my name this 11th day of April, 1922.

ELIJAH M. KINSLOW.